UNITED STATES PATENT OFFICE.

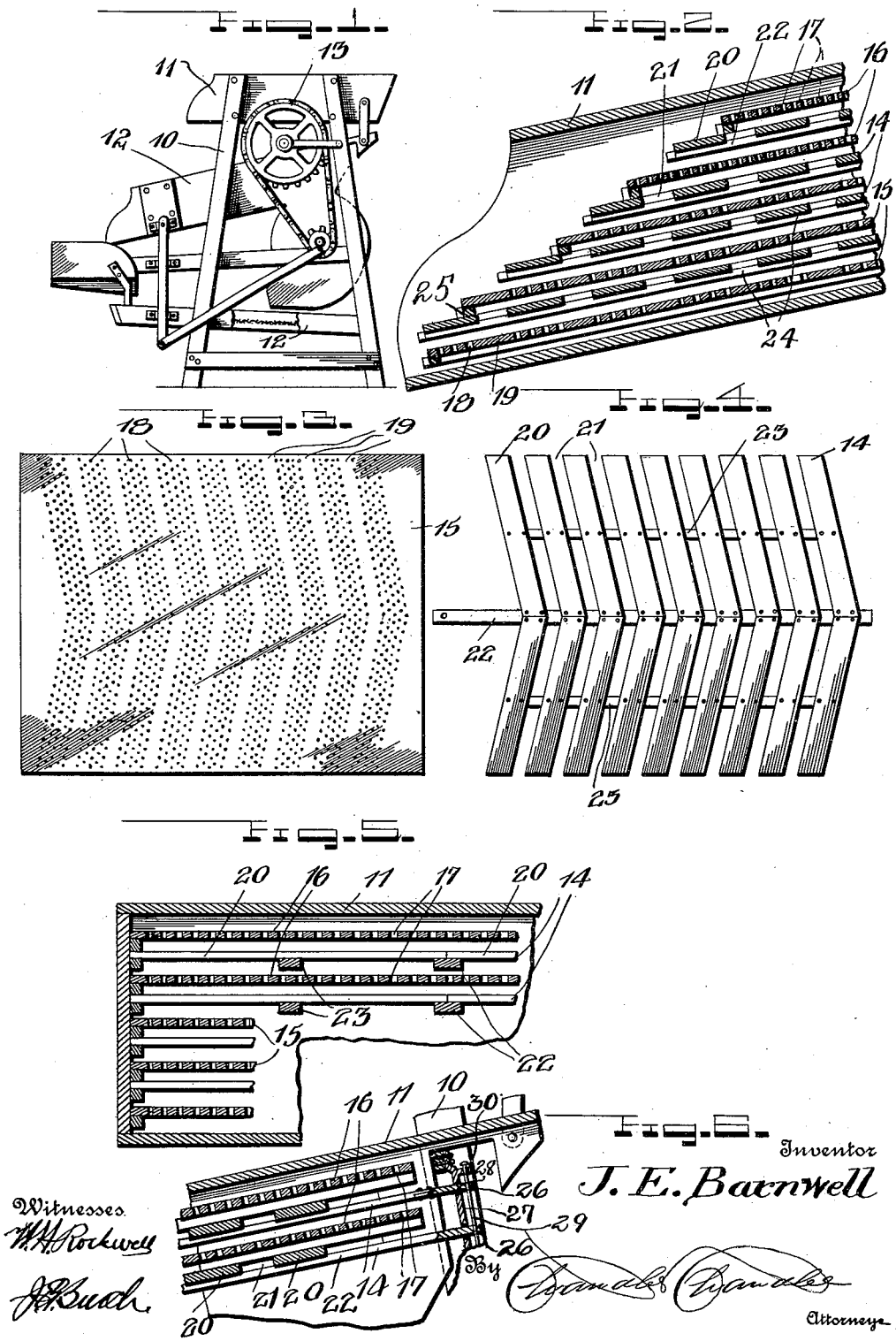

JOHN E. BARNWELL, OF ELKTON, SOUTH DAKOTA.

WHEAT-GRADER FOR FANNING-MILLS.

1,098,079.   Specification of Letters Patent.   Patented May 26, 1914.

Application filed October 14, 1912. Serial No. 725,717.

*To all whom it may concern:*

Be it known that I, JOHN E. BARNWELL, a citizen of the United States, residing at Elkton, in the county of Brookings, State of South Dakota, have invented certain new and useful Improvements in Wheat-Graders for Fanning-Mills; and I do hereby declare the following to be a full, clear, and exact description of the invention, such as will enable others skilled in the art to which it appertains to make and use the same.

This invention has special reference to fanning mills and more particularly to an improved wheat grader therefor.

The invention resides in the provision of an improved wheat grader for separating two different grains such as wheat and oats and which embodies a novel arrangement of slats and sieves coöperating therewith to allow the passage of the wheat through the sieves but cause the oats to pass or float off and be discharged in a separate collection.

The essential object of the invention is to provide a gang or battery for separators in which the screens are formed of sections of sheet metal having rows of openings therethrough spaced apart in diagonal rows and slat frames adapted to coöperate with the sieves whereby the slats will overlie the rows of openings and when the sieves are shaken or agitated the grain will work under the slats and the wheat will drop through, thus causing the oats or grain to float out and off of the sieves.

Another object of primary importance is evolved in the provision of a grader employing slats adapted to direct the wheat and oats on to the solid portions of the sieves so that the oats will lie on their sides and float out while the wheat will pass through the openings and sieves.

With the above and other objects in view, the invention consists of certain other combinations and arrangements of parts as will be hereinafter more fully described, claimed and illustrated in the accompanying drawings, in which:

Figure 1 is a side elevation of my improved wheat grader for fanning mills applied to a fanning mill shown partly broken away. Fig. 2 is an enlarged longitudinal sectional view of my improved wheat grader. Fig. 3 is a top plan view of one of my improved sieves. Fig. 4 is a top plan view of one of my improved slatted frames adapted to coöperate with the sieves. Fig. 5 is a cross sectional view of the device shown in Fig. 2. Fig. 6 is a detail view showing the manner of anchoring the frames.

In illustrating the practical use of my improved wheat grader for wheat fanning mills, there is illustrated a fanning mill having a supporting frame 10 and a supply trough 11 adapted for feeding the wheat and wild oats as harvested on to the separator frame 12 agitated from a suitable hand wheel 13 or in any other approved manner. My improved wheat grader is in the form of a gang or battery of sieves carried by the agitating frame and comprises a plurality of alternate slatted frames or sieves 14 and 15 respectively.

The two top sieves are illustrated by the numeral 16 and each comprises a section of sheet metal, preferably zinc having a continuous series of rows of openings 17 arranged in staggered relation. The bottom sieves, three of which are employed, are also formed of sheet metal and provided with alternate diagonal rows of openings 18 extending in convergent relation from the transverse center of each sieve to opposite sides of the sieve to provide intermediate solid or imperforate spaces 19 between the perforate portions.

In practice, the widths of the perforate and imperforate portions may be regulated according to the desires of the operator and the particular grade of material to be separated but it has been found by practical use that the perforate spaces should be 1 and ½ inches in width and the imperforate portions ¾ of an inch in width. Coöperating with the sieves and more particularly with the lower sieves by reason of the arrangement of the perforate and imperforate portions thereof, are the stationary slatted frames heretofore described and between which the sieves are agitated. The sieves 15 are arranged so that the intermediate sieve has its diagonal rows of openings extended in an opposite direction from those of the other sieves or in other words reversed in position so that the slats of the frames will not crowd the grain to the sides of the sieve. Two of the slatted frames each comprises a plurality of diagonal slats 20 with intermediate spaces 21, the inner ends of the slats being connected by a center bar 22 which projects beyond one end of the frame as shown and is secured to the frame of the machine to rigidly anchor them.

The intermediate portions of the slats are connected by longitudinal brace rods 23 whereby they are held properly spaced apart. The other pair of slatted frames are connected centrally by a leather strap section 24 and at each side thereof by strap sections 25 so as to allow slight independent movement of the slats to prevent clogging of the wheat or grain. These frames are anchored at the ends of their central connecting members as shown at 26 and are supported on holders 27 at the front of the mill so that as the sieves are agitated or reciprocated between the slatted frames, the grain and wheat will drop between the slats and under the same and the two upper sieves will permit only a small portion of the oats to pass through openings therein while as the lower sieves are agitated the perforate portions thereof will be moved between the slats to permit the material to fall and cause the oats to be moved beneath the slats while the wheat passes through the opening. This is especially due to the fact that the oats will fall on the solid portions of the sieves and move on their sides so that they will be discharged at the ends of the sieves.

The ends of strap sections 24 are made rigid by metallic portions 28 which are passed through the stationary holder 27 and anchored by a pin 29 carried by ears 30 and passed through the arms.

I claim:

1. A wheat grader for fanning mills embodying sieves and slatted frames coöperating therewith, said sieves having a plurality of diagonal rows of perforate portions and intermediate imperforate portions.

2. A wheat grader for fanning mills comprising a plurality of perforate sieves, certain of said sieves having their perforate portions extending on diagonal lines and slats coöperating therewith and disposed above said perforate portions to cause the oats to pass beneath the slats upon agitation of the sieves.

3. A wheat grader comprising in part, sheet metal sieves having a plurality of diagonal rows of perforate portions and intermediate imperforate sections.

4. In a fanning mill, sieves having converging perforate sections and an intermediate imperforate section and spaced diagonally extended and connected slats normally disposed above the perforate portions.

In testimony whereof, I affix my signature, in presence of two witnesses.

JOHN E. BARNWELL.

Witnesses:
C. O. PETERSON,
O. F. SALK.

Copies of this patent may be obtained for five cents each, by addressing the "Commissioner of Patents, Washington, D. C."